US011336913B2

United States Patent
Rapaka et al.

(10) Patent No.: US 11,336,913 B2
(45) Date of Patent: May 17, 2022

(54) REFERENCE PICTURE RE-SAMPLING

(71) Applicant: Apple Inc., Cupertino, CA (US)

(72) Inventors: Krishnakanth Rapaka, San Jose, CA (US); Alexandros Tourapis, Milpitas, CA (US); David W. Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 16/799,423

(22) Filed: Feb. 24, 2020

(65) Prior Publication Data

US 2021/0160523 A1     May 27, 2021

Related U.S. Application Data

(60) Provisional application No. 62/939,475, filed on Nov. 22, 2019.

(51) Int. Cl.
*H04N 19/503* (2014.01)
*H04N 19/86* (2014.01)
*H04N 19/82* (2014.01)

(52) U.S. Cl.
CPC .......... *H04N 19/503* (2014.11); *H04N 19/82* (2014.11); *H04N 19/86* (2014.11)

(58) Field of Classification Search
CPC ....... H04N 19/503; H04N 19/82; H04N 19/86
USPC ........................................ 375/240
See application file for complete search history.

(56) References Cited

U.S. PATENT DOCUMENTS

| 2012/0207214 | A1 | 8/2012 | Zhou et al. | |
| 2017/0318293 | A1* | 11/2017 | Chono | H04N 19/186 |
| 2019/0158835 | A1* | 5/2019 | Lee | H04N 19/50 |

* cited by examiner

*Primary Examiner* — Amir Shahnami
(74) *Attorney, Agent, or Firm* — BakerHostetler

(57) ABSTRACT

Predictive coding techniques may include resampling of reference pictures, where various coding parameters are determined based on the resolution(s) or pixel format(s) of the prediction references. In a first aspect, lists of weights for use in weighted prediction are based on the resolution(s) of prediction references. In a second aspect, resampling filter parameters are selected based on the resolutions of prediction references. In a third aspect, deblocking filter parameters are based on the resolution(s) of prediction references.

12 Claims, 8 Drawing Sheets

100

200

300

400

500

620

Case B: Ref0 and Ref1 lower resolution

660

Case B: Ref0 and Ref1 lower resolution

600

Case A: Ref0 lower resolution and Ref1 higher resolution

640

Case A: Ref0 lower resolution and Ref1 higher resolution

700

750

800

900

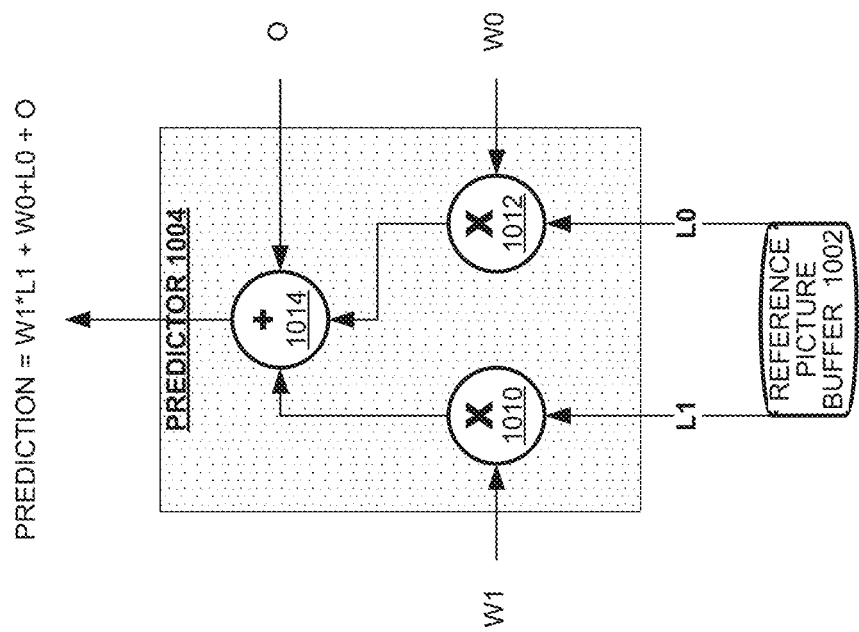

REFERENCE PICTURE RE-SAMPLING

CROSS REFERENCE TO RELATED APPLICATIONS

The present application claims priority to U.S. Application No. 62/939,475, filed Nov. 22, 2019, the disclosures of which are incorporated herein by reference in their entirety.

BACKGROUND

The present disclosure relates to video coding and, more particularly, block-based predictive coding.

Traditional image and video coding schemes commonly employ prediction, computing a residual from the prediction, transform and quantization of the residual, in-loop filtering, and entropy coding to produce a compressed bitstream.

BRIEF DESCRIPTION OF THE DRAWINGS

FIG. 10 is an example functional block diagram for weighted prediction of image data.

DETAILED DESCRIPTION

Aspects disclosed include predictive coding techniques with resampling of reference pictures, where various coding parameters are determined based on the resolution(s) of the prediction references. In a first aspect, lists of weights for use in weighted prediction are based on the resolution(s) of prediction references. In a second aspect, resampling filter parameters are selected based on the resolutions of prediction references. In a third aspect, deblocking filter parameters are based on the resolution(s) of prediction references.

Figure 1:
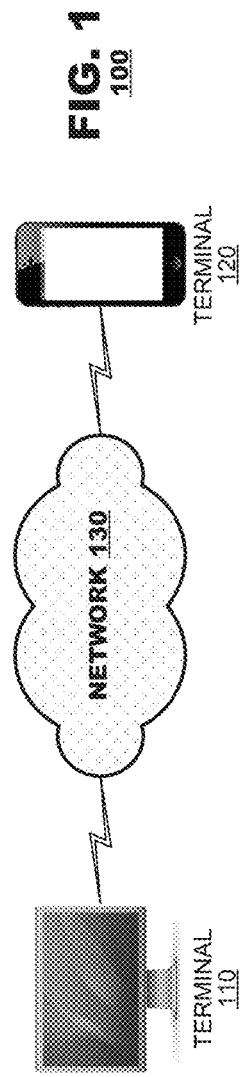
FIG. 1 illustrates an example simplified block diagram of a video delivery system.

FIG. 1 illustrates a simplified block diagram of a video delivery system 100 according to an aspect of the present disclosure. The system 100 may include a plurality of terminals 110, 120 interconnected via a network. The terminals 110, 120 may code video data for transmission to their counterparts via the network. Thus, a first terminal 110 may capture video data locally, code the video data and transmit the coded video data to the counterpart terminal 120 via a channel. The receiving terminal 120 may receive the coded video data, decode it, and render it locally, for example, on a display at the terminal 120. If the terminals are engaged in bidirectional exchange of video data, then the terminal 120 may capture video data locally, code the video data and transmit the coded video data to the counterpart terminal 110 via another channel. The receiving terminal 110 may receive the coded video data transmitted from terminal 120, decode it, and render it locally, for example, on its own display. The processes described herein may operate coding of on both frame pictures and interlaced field pictures but, for simplicity, the present discussion will describe the techniques in the context of integral frames.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as a personal computer and a smart phone, respectively, but the principles of the present disclosure are not so limited. Aspects of the present disclosure also find application with various types of computers (desktop, laptop, and tablet computers), computer servers, media players, dedicated video conferencing equipment, and/or dedicated video encoding equipment.

The network 130 represents any number of networks that convey coded video data between the terminals 110, 120, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

Figure 2:
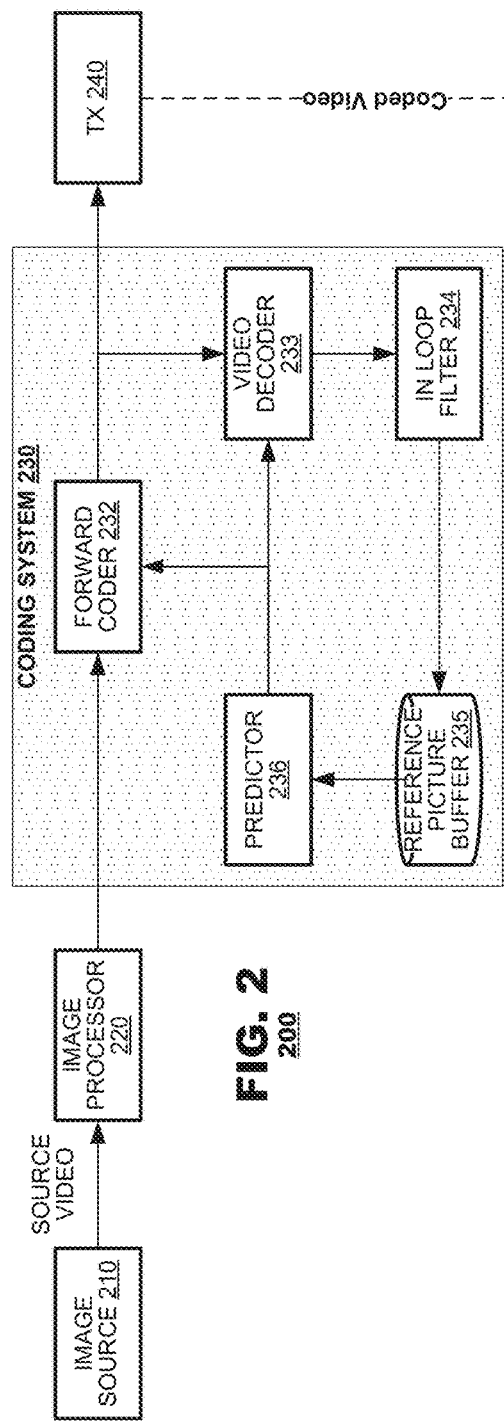
FIG. 2 is a functional block diagram illustrating components of an example encoding terminal.

FIG. 2 is a functional block diagram illustrating components of an encoding terminal 200 according to an aspect of the present disclosure. The encoding terminal may include a video source 210, an image processor 220, a coding system 230, and a transmitter 240. The video source 210 may supply video to be coded. The video source 210 may be provided as a camera that captures image data of a local environment, a storage device that stores video from some other source or a network connection through which source video data is received. The image processor 220 may perform signal conditioning operations on the video to be coded to prepare the video data for coding. For example, the preprocessor 220 may alter the frame rate, frame resolution, and/or other properties of the source video. The image processor 220 also may perform filtering operations on the source video.

The coding system 230 may perform coding operations on the video to reduce its bandwidth. Typically, the coding system 230 exploits temporal and/or spatial redundancies within the source video. For example, the coding system 230 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

intra-coding, in which an input pixel block is coded differentially with respect to previously coded/decoded data of a common frame;

single prediction inter-coding, in which an input pixel block is coded differentially with respect to data of a previously coded/decoded frame; and multi-hypothesis motion compensation predictive coding, in which an input pixel block is coded predictively using previously decoded data from two or more sources, via temporal or spatial prediction.

The predictive coding modes may be used cooperatively with other coding techniques, such as Transform Skip coding, reduced-resolution update (RRU) coding, scaling of prediction sources, palette coding, and the like.

The coding system 230 may include a forward coder 232, a decoder 233, an in-loop filter 234, a picture buffer 235, and a predictor 236. The coder 232 may apply the differential coding techniques to the input pixel block using predicted pixel block data supplied by the predictor 236. The decoder 233 may invert the differential coding techniques applied by the coder 232 to a subset of coded frames designated as reference frames. The in-loop filter 234 may apply filtering techniques to the reconstructed reference frames generated by the decoder 233. The picture store 235 may store the reconstructed reference frames for use in prediction operations. The predictor 236 may select a prediction mode and reference and then predict data for input pixel blocks from within the reference frames stored in the picture store. In an aspect, predictor 236 may resample or interpolate reference frame data from the reference picture buffer to predict a current image having a resolution different from a reference frame.

The transmitter 240 may transmit coded video data to a decoding terminal via a channel.

Figure 3:
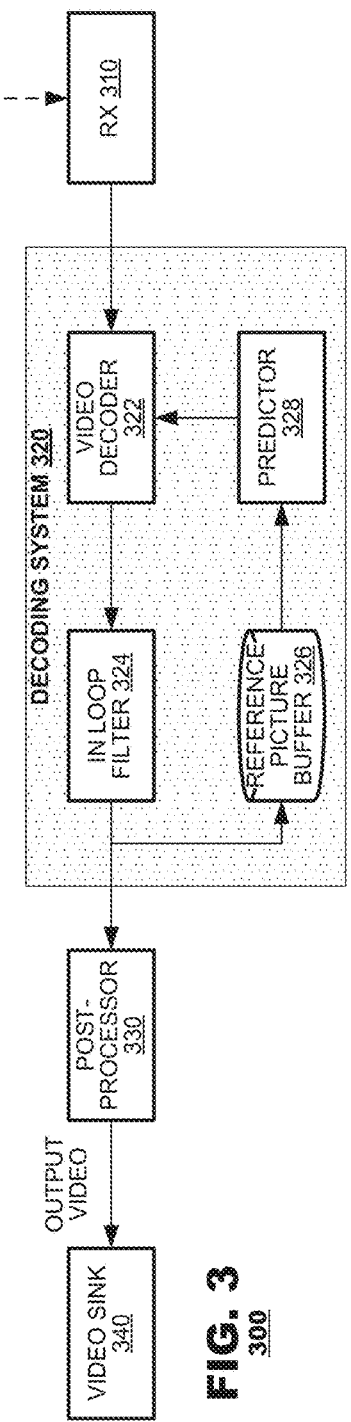
FIG. 3 is a functional block diagram illustrating components of an example decoding terminal.

FIG. 3 is a functional block diagram illustrating components of a decoding terminal 300 according to an aspect of the present disclosure. The decoding terminal may include a receiver 310 to receive coded video data from the channel, a video decoding system 320 that decodes coded data, a post-processor 330, and a video sink 340 that consumes the output video data.

The receiver 310 may receive a data stream from the network and may route components of the data stream to appropriate units within the terminal 300. Although FIGS. 2 and 3 illustrate functional units for video coding and decoding, terminals 110, 120 (FIG. 1) often will include coding/decoding systems for audio data associated with the video and perhaps other processing units (not shown). Thus, the receiver 310 may parse the coded video data from other elements of the data stream and route it to the video decoder 320.

The video decoding system 320 may perform decoding operations that invert coding operations performed by the coding system 230. The video decoder may include a decoder 322, an in-loop filter 324, a picture buffer 326, and a predictor 328. The decoder 322 may invert the differential coding techniques applied by the coder 232 to the coded frames. The in-loop filter 324 may apply filtering techniques to reconstructed frame data generated by the decoder 322. For example, the in-loop filter 324 may perform various filtering operations (e.g., de-blocking, de-ringing filtering, sample adaptive offset processing, and the like). The filtered frame data may be output from the decoding system. The reference picture buffer 326 may store reconstructed reference frames for use in prediction operations. The predictor 328 may predict data for input pixel blocks from within the reference frames stored by the reference picture buffer according to prediction reference data provided in the coded video data. In an aspect, predictor 328 may resample or interpolate reference frame data from the reference picture buffer to predict a current image having a resolution different from a reference frame.

The post-processor 330 may perform operations to condition the reconstructed video data for display. For example, the post-processor 330 may perform various filtering operations (e.g., de-blocking, de-ringing filtering, and the like), which may obscure visual artifacts in output video that are generated by the coding/decoding process. The post-processor 330 also may alter resolution, frame rate, color space, etc. of the reconstructed video to conform it to requirements of the video sink 340.

The video sink 340 represents various hardware and/or software components in a decoding terminal that may consume the reconstructed video. The video sink 340 typically may include one or more display devices on which reconstructed video may be rendered. Alternatively, the video sink 340 may be represented by a memory system that stores the reconstructed video for later use. The video sink 340 also may include one or more application programs that process the reconstructed video data according to controls provided in the application program. In some aspects, the video sink may represent a transmission system that transmits the reconstructed video to a display on another device, separate from the decoding terminal; for example, the reconstructed video generated by a notebook computer may be transmitted to a large flat panel display for viewing.

The foregoing discussion of the encoding terminal and the decoding terminal (FIGS. 2 and 3) illustrates operations that are performed to code and decode video data in a single direction between terminals, such as from terminal 110 to terminal 120 (FIG. 1). In applications where bidirectional exchange of video is to be performed between the terminals 110, 120, each terminal 110, 120 will possess the functional units associated with an encoding terminal (FIG. 2) and each terminal 110, 120 will possess the functional units associated with a decoding terminal (FIG. 3). Indeed, in certain applications, terminals 110, 120 may exchange multiple streams of coded video in a single direction, in which case, a single terminal (say terminal 110) will have multiple instances of an encoding terminal (FIG. 2) provided therein. Such implementations are fully consistent with the present discussion.

Figure 4:
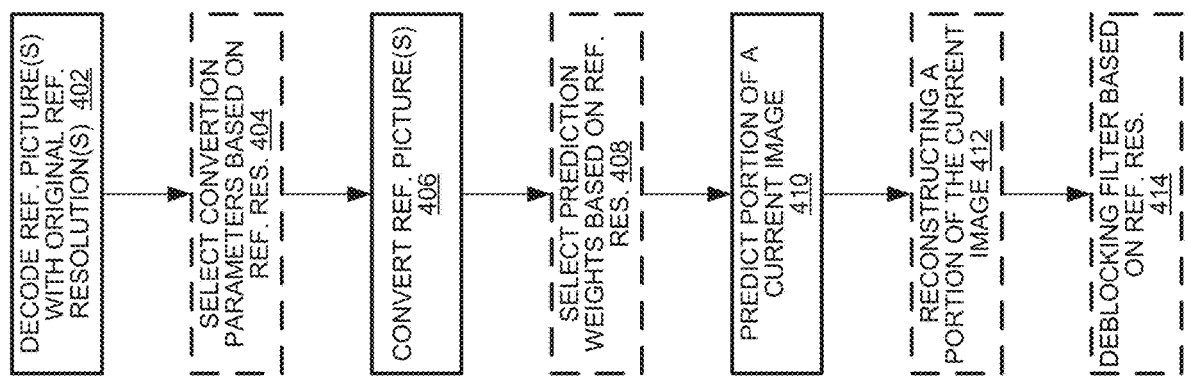
FIG. 4 is an example flow diagram for encoding or decoding.

FIG. 4 is an example flow diagram 400. The process of the flow diagram 400 may be used during encoding or decoding. Flow diagram 400 includes decoding one or more encoded reference pictures (box 402), each decoded reference picture having an original reference resolution (Ref. Res.) and original reference pixel format, the decoded reference picture(s) are converted such as by resampling to a new resolution (box 406), and a portion of a current image is predicted based on the resampled or otherwise converted reference picture(s) (box 410). Note that the original reference resolution, as used herein, may refer to the resolution of reference pictures as output from a decoder (such as decoders 233 or 322 of FIGS. 2 and 3) and originally stored in decoded picture buffer, which may be different from a source picture resolution (such as resolution of image source picture 210 of FIG. 2) due. The original reference resolution may be the same as the coded resolution of a reference picture, and may contrast with a resampled resolution of the same reference picture.

In aspects, resampling is just one type of reference picture conversion. Other types of reference picture conversion may include a change in spatial resolution, a change in pixel color format (including chroma subsampling conversion), pixel bit depth conversion (changing bits per pixel color component value), and/or pixel filtering operations (such as denoising, smoothing, blurring etc.).

In a first optional aspect, parameters for resampling or another type of reference picture conversion may be selected based on the resolution or format of the original reference pictures (optional box 404). For example, resampling parameters may include selection of a resampling filter, and a resampling filter may be selected based on the amount, direction (e.g. shrink or enlarge), or type (e.g. spatial resolution, color format conversion, or pixel value bit depth) of resampling. The selected resampling parameters may then be used when resampling in box 406.

In a second optional aspect, prediction weights for multi-hypothesis prediction may be selected based on the resolution of the original reference picture (optional box 408). Weights may be selected based on the original reference picture resolutions or pixel formats, including difference between original reference picture resolutions or differences between reference picture formats. In one example, when the original reference picture resolutions and pixels formats are all the same for a particular prediction, then the weights selected for the corresponding references pictures may also be the same. In another example, reference pictures with higher original reference resolution before resampling may be given a higher weight as compared to reference pictures with a smaller original resolution. The selected prediction weights may then be used during multi-hypothesis prediction in box 410.

In a third optional aspect, deblocking filter parameters may be based on an original reference resolution or format of a reference picture (box 414). For example, predicted image data from box 410 may be used to reconstruct a portion of the current image (box 410), such as by adding the predicted image data to a decoded prediction error, and the reconstructed portion of the current image may be filtered with a deblocking filter using the selected deblocking filter parameters. For example, for a deblocking filter applied at a boundary between neighboring blocks, deblocking filter parameters are selected based on the references used to predict the neighboring blocks. If different references are used to predict the neighboring blocks, deblocking parameters may be selected based on the differences between the prediction references, so that a different deblocking filter or filter strength may be selected based on the difference in reference resolution or reference pixel format between the references of the neighboring blocks.

In an aspect, operational parameters may be stored in a compressed bitstream. For example, when process 400 is embodied in an encoder, an indication of resampling or conversion parameters, prediction weights, and/or deblocking filter parameters may be encoded in a resultant compressed bitstream. When process 400 is embodied in a decoder, indications of such parameters maybe extracted from an input compressed bitstream. Such operational parameters may be decided for various levels of a video stream, and may be encoded into, or extracted from, various layers of bitstream syntax. Decision levels and syntax layers may include a sequence parameter set (SPS), or picture parameter set (PPS), tile group, slice, or block level (such as CTU).

Reference Picture Reformatting Overview

Reference picture reformatting and reference picture resampling (RPR) is an image data prediction technique. Generally, this technique allows different pictures in a sequence of pictures to be coded at different resolutions or formats, while prediction is also allowed to be performed using references of different resolutions or formats. While in some cases reference picture resampling may be limited to resampling of spatial resolution, the concept may also be extended to resampling of bit depth. For example, different frames in a sequence may be encoded at different bit depths, such as 10 or 8 bits per pixel value. Reference picture resampling may also be extended to resampling for frames of differing chroma format, such as conversion between 4:4:4 and 4:2:0 where the resolution of only some color components are resampled. Reference picture reformatting may include differences in in color representations for different frames, e.g. RGB vs YCbCr or YCbCr in BT.2100 PQ vs BT.709.

Figure 5:
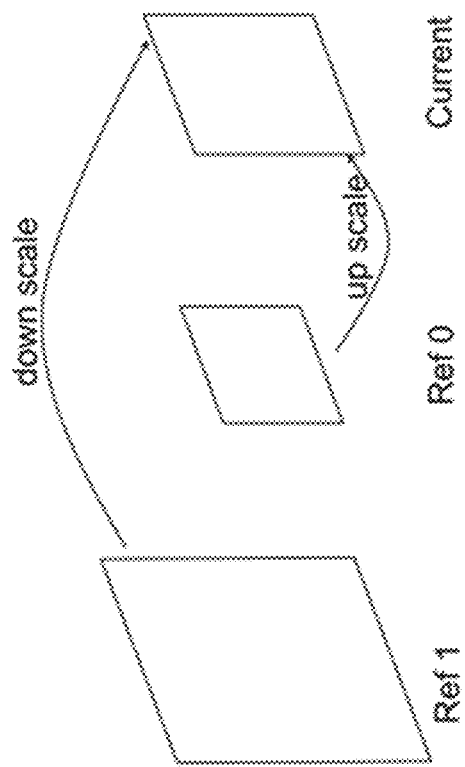
FIG. 5 depicts an example of prediction with reference picture resolution resampling.

FIG. 5 depicts an example 500 of prediction with reference picture resolution resampling. In this example, three different pictures (Ref1, Ref0, and Current) are coded, each at a different resolution. The variation in selected resolution for each picture may relate to a variety of reasons that may include coding performance, rate control behavior, bandwidth changes in a communication system, change of the importance of a video in a multi-conference system, could be user specified, etc. The concept could also be desirable to achieve different types of scalability, such as spatial scalability in the case where one only cares about resolution. In example 500, the first picture (Ref1) may be coded at a resolution A, while the two other pictures may be coded at lower resolutions, and the resolutions of all three pictures may be different from each other. Assuming that the first and second pictures have already been coded and assigned as references Ref1 and Ref0 for the third picture (labeled as current) it can be seen that the resolution of Ref0 and Ref1 are lower and higher, respectively, than the resolution of the current picture. RPR enables the use of either or both of these references (Ref0 and Ref1) to be used for prediction. When the current picture predicts from Ref0, the prediction samples from Ref0 may be upscaled to the resolution of the current picture. Similarly, to predict the current picture from Ref1, the prediction samples from Ref1 may be down sampled to the resolution of the current picture.

In other aspects, where the difference between the pictures is of another type, such as bit depth or chroma format, an appropriate conversion to the bit depth or chroma format of the current picture may be done when predicting. It should be noted that the concepts we describe herein could be easily extended to such other applications although this disclosure will mostly describe the case of differences in resolution.

The motion compensation interpolation filters can be utilized to perform the resampling process and to generate the prediction samples. Similarly, a scaled prediction scheme can use the motion compensation interpolation filters for the prediction process. This may be done in this manner to constrain somewhat the complexity of this process since no additional processing stages need to be added in the prediction loop.

Applications of reference picture resampling may include:
    Video conferencing
        for its ability to adapt rate to diverse networks and devices
        for resolution/bitrate adaptivity based on active speaker
            reduced startup delay/buffering Adaptive streaming at TRAP points
   for its ability to decode RASL pictures in open GOPs using resampled references from different representations
   because of reduced startup delay/buffering
View port change in region-wise mixed resolution 360 video streaming/3DoF+
   since view orientation changes temporally cause sub-picture locations to be selected at different resolution,
   since it makes it sufficient to update sub-pictures without TRAP
Scalability
   since it enables the ability to predict across representations with different spatial resolution Aspects of this disclosure may provide improvements in the quality and characteristics of prediction because of the discrepancies in resolution in the signals due to the RPR process.

Weighted Prediction with Reference Picture Resampling

Weighted prediction is an advanced prediction method that may be utilized for handling illumination changes within a scene, for handling special transitions such as fades and cross-fades, or for better exploiting the asymmetric quality that may exist across prediction samples. With weighted prediction, a prediction is derived not only by copying or filtering pixel data from previously encoded regions of previous frames or the current frame, but also through applying a weight and offset to the prediction samples. Weighted prediction can also be applied to multi hypothesis prediction, e.g. bi-prediction, where, in addition to an offset, different weights are used to weigh each hypothesis prior to combining them together to generate a final prediction. An example system for bi-prediction is depicted in FIG. 10. The weighted prediction methods discussed herein may be applied independently or in combination with other methods proposed herein.

In the Motion Picture Experts Group (MPEG-4) Advanced Video Coding (AVC)/H.264 video coding standard, two types of weighted predictions were supported. An explicit mode where, optionally, weights and offsets were explicitly derived and signaled in the stream at the slice level, while in the implicit mode weights for bi-predictively coded partitions were derived through the consideration of the picture order count of the current picture and its references. In High Efficiency Video Coding (HEVC) only the explicit weighted prediction mode was retained, while in Versatile Video Coding (VVC), apart from the explicit weighted prediction mode a new mode was introduced for bi-predicted partitions that allowed for a partition to select from a list of pre-defined weight combinations, the most appropriate method for the prediction of the current block.

More specifically, in an example "weight-list based" prediction process, the process for deriving the prediction sample values pbSamples[x][y], given the indicated weight-list mode bcwIdx and the prediction reference samples from L0 and L1, predSamplesL0[x][y] and predSamplesL1[x][y], may be as follows:
   ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.
   The variable shift2 is set equal to Max(3, 15−bitDepth).
   The variable offset1 is set equal to 1<<(shift1−1).
   The variable offset2 is set equal to 1<<(shift2−1).
   The variable offset3 is set equal to 1<<(shift2+2).
      If bcwIdx is equal to 0 (default; no weighted bi-prediction) or ciip_flag[xCb][yCb] is equal to 1, the prediction sample values are derived as a combination of non-weighted prediction reference samples as follows:
         pbSamples[x][y]=Clip3(0, (1<<bitDepth)−1, (predSamplesL0[x][y]+predSamplesL1 [x][y]+offset2)>>shift2)
   Otherwise (bcwIdx is not equal to 0 and ciip_flag[xCb][yCb] is equal to 1):
      The variable w1 is set equal to bcwWLut[bcwIdx] with bcwWLut[k]={4, 5, 3, 10, −2}. This is a list of weights to be used in weighted prediction.
      The variable w0 is set equal to (8−w1).
      The prediction sample values are derived as a combination of weighted prediction reference samples as follows:

pbSamples[$x$][$y$]=Clip3(0,(1<<bitDepth)−1, ($w0$*predSamples$L0$[$x$][$y$]+$w1$*predSamples$L1$[$x$][$y$]+offset3)>>(shift2+3))

In the "explicit weighted" prediction process of these standards, explicit weighting may be applied for both uni-predicted and bi-predicted samples. Specific weights and offsets can be signaled at the slice-level for every active reference picture in each list (list0 and list1). Different weights and offsets could also be signaled for the two chroma components. During the prediction process, the signaled weights are used to weigh accordingly the samples of the list0 and/or list1 reference pictures that may be used for prediction, prior to combining them together, in the case of bi-prediction to generate the final prediction for the current block. Similar to the previous case, prediction sample values pbSamples[x][y] for the bi-predictive case may be derived as follows:
   The variable shift1 is set equal to Max(2, 14—bitDepth).
   For luma samples, the variables log 2Wd, o0, o1, w0, and w1 are derived as follows:
   The variable LumaWeightL0[i] is derived to be equal to (1<<luma_log 2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0 flag[i] is equal to 0, LumaWeightL0[i] is inferred to be equal to $2^{luma\_log2\_weight\_denom}$. LumaWeightL1 is derived similarly for list 1.
Then, the prediction sample values are derived as follows:

log 2$Wd$=luma_log 2weight_denom+shift1

$w0$=LumaWeight$L$0[refIdx$L$0]

$w1$=LumaWeight$L$1[refIdx$L$1]

$o0$=luma_offset_$l$0[refIdx$L$0]<<(BitDepth$_Y$−8)

$o1$=luma_offset_$l$1[refIdx$L$1]<<(BitDepth$_Y$−8)

pbSamples[$x$][$y$]=Clip3(0,(1<<bitDepth)−1, (predSamples$L$0[$x$][$y$]*$w0$+predSamples$L$1[$x$][$y$]*$w1$+(($o0$+$o1$+1)<<log 2$Wd$))>>(log 2$Wd$+1))

The above weight-list based and explicitly weighted prediction processes have some drawbacks. When the reference pictures are of different resolution compared to the current picture, the reference picture is scaled to the resolution of the current picture for prediction. This introduces an up-sampling/down-sampling stage. The current design for weighted prediction is primarily designed for predicting from the same resolution reference pictures and may not be suitable for the cases when predicting with references of different resolutions for various reasons. It is obvious that the characteristics of the prediction signal when predicting from a reference picture that is of a different resolution compared to the current picture may vary from the characteristics of a prediction signal that is predicted from another reference picture that is of a different resolution. For example:

a) The current weight list process does not take in account the characteristics of the RPR mode. In particular, it could be argued that the default weight order as well as the existing weights specified currently in the weight list might not be as suitable for the use with RPR since the characteristics of the references are also impacted by their resolution. For example, when combining two references, one of a higher resolution and one of a lower resolution, it might be preferable to assign a higher weight to the reference that has the higher resolution since that is an indicator of higher quality. However, in the current design the truncated rice coding of the weight index favours the following order for assigning the List0 and List1 weights: {L0=1/2, L1=1/2}, {L0=5/8, L1=3/8}, {L0=3/8, L1=5/8}, {L0=10/8, L1=−2/8}, {L0=−2/8, L1=10/8} b) In this list, there is essentially no consideration of the reference picture resolution.

c) As discussed above, the weight-list based method is limited to 5 weight combinations. The combination for each block is signaled using an index parameter. As different resolutions may be possible for each reference picture, weights that are specific to the reference pictures resolutions are not available in the current design.

d) In addition to the above, in the explicit weighted bi-prediction case both list0 and list1 references could have a different resolution as well as differ from the resolution of the current picture. The signaling and application of the explicit weights does not currently consider such relationships.

In the explicit weighted prediction scheme, the weights are signaled at the slice level for each active reference picture in both lists. The signaling is not flexible and for example, does not provide a way to weigh differently the following cases:

Case A—When the active reference picture used by the current coding unit in list L0 is of a lower resolution compared to an active reference picture used by the current coding unit in list L1.

Case B—When the active reference picture used by the current coding unit in list L0 is of the same resolution compared to an active reference picture used by the current coding unit in list L1.

Case C—When the active reference picture used by the current coding unit in list L0 is of a higher resolution compared to an active reference picture used by the current coding unit in list L1.

Weighted-List Prediction with Reference Resolution Considerations

Both weight-list based prediction schemes and explicit weighted prediction schemes may be improved by adding consideration for the original resolution of reference pictures. The below methods may be applied to above-described video coding system as well as extended to other methods for signaling weighted prediction, including signaling explicitly weighted prediction parameters at the block level.

In a first aspect, prediction with RPR may conditionally signal prediction weight lists at the coding-unit level based on the resolution of the current picture and the resolution of its references. In this mode, the signaling of the CU-level weighting parameters is disabled when at least one of the reference pictures used for the current coding unit has a different resolution compared to the current picture, or is different from the resolution of the other reference pictures. Alternatively, implicitly use default weighting (that is equal weighting) for multihypothesis prediction, e.g. bi-prediction, when predicting from reference picture(s) that have a different resolution from the current picture or at least one of them is different.

Below is an example implementation:

Let refPicWidthInLumaSamplesL0[i] and refPicHeightInLumaSamplesL0[i] be the luma width and luma height, respectively, of a list 0 reference picture corresponding to the reference index ref_idx_l0 [x0][y0] for a block at position (x0, y0).

Let refPicWidthInLumaSamplesL1[i] and refPicHeightInLumaSamplesL1[i] be the luma width (pic_width_in_luma_samples) and the luma height (pic_height_in_luma_samples), respectively, of a list 1 reference picture corresponding to the reference index ref_idx_l1 [x0][y0] for the same block.

Let pic_width_in_luma_samples and pic_height_in_luma_samples be the luma width and height of the current picture respectively. Also, sps_bcw_enabled_flag is the parameter in the sequence parameter sets that enables the list based weighted prediction. The syntax element inter_pred_idc[x0][y0] indicates the type of inter prediction of this block, and if this value is equal to PRED_BI then this block is a bi-predictively coded block.

Then bcw_idx can be signalled according to the following:

```
if( sps_bcw_enabled_flag && inter_pred_idc[ x0 ][ y0 ] = =
PRED_BI &&
    luma_weight_l0_flag[ ref_idx_l0 [ x0 ][ y0 ] ] = = 0 &&
    luma_weight_l1_flag[ ref_idx_l1 [ x0 ][ y0 ] ] = = 0 &&
    chroma_weight_l0_flag[ ref_idx_l0 [ x0 ][ y0 ] ] = = 0 &&
    chroma_weight_l1_flag[ ref_idx_l1 [ x0 ][ y0 ] ] = = 0 &&
    cbWidth * cbHeight >= 256 &&
    ( refPicWidthInLumaSamplesL0[ ref_idx_l0 [ x0 ][ y0 ] ]
        = = pic_width_in_luma_samples ) &&
    ( refPicHeightInLumaSamplesL0[ ref_idx_l0 [ x0 ][ y0 ] ]
        = = pic_height_in_luma_samples ) &&
    ( refPicWidthInLumaSamplesL1[ ref_idx_l1 [ x0 ][ y0 ] ]
        = = pic_width_in_luma_samples ) &&
    ( refPicHeightInLumaSamplesL1[ ref_idx_l1 [ x0 ][ y0 ] ]
        = = pic_height_in_luma_samples )
)
then bcw_idx[ x0 ][ y0 ] is signalled in the bitstream (for example with
"ae(v)" signalling)
```

Alternatively, bcw_idx can be signaled even when explicit weights (luma_weight_l0_flag and luma_weight_l1_flag) are signaled and non-zero in the slice header. This allows

```
if( sps_bcw_enabled_flag && inter_pred_idc[ x0 ][ y0 ] = =
PRED_BI &&
    cbWidth * cbHeight >= 256 &&
    ( refPicWidthInLumaSamplesL0[ ref_idx_l0 [ x0 ][ y0 ] ]
        = = pic_width_in_luma_samples ) &&
    ( refPicHeightInLumaSamplesL0[ ref_idx_l0 [ x0 ][ y0 ] ]
        = = pic_height_in_luma_samples ) &&
```

-continued

```
( refPicWidthInLumaSamplesL1[ ref_idx_l1 [ x0 ][ y0 ] ]
    = = pic_width_in_luma_samples ) &&
( refPicHeightInLumaSamplesL1[ ref_idx_l1 [ x0 ][ y0 ] ]
    = = pic_height_in_luma_samples )
)
then bcw_idx[ x0 ][ y0 ] is signalled in the bitstream (for example with
"ae(v)" signalling)
```

In an aspect, either of these methods for signalling bcw_idx may be used with an alternative process for deriving the prediction samples, such as the following:

The variable refResampleIdx is set equal to '0' if all of the below conditions are true else set to '1':—
 a) refPicWidthInLumaSamplesL0[ref_idx_l0 [x0][y0]]==pic_width_in_luma_samples and
 b) refPicHeightInLumaSamplesL0[ref_idx_l0 [x0][y0]]==pic_height_in_luma_samples and
 c) refPicWidthInLumaSamplesL1 [ref_idx_l1 [x0][y0]]==pic_width_in_luma_samples and
 d) refPicHeightInLumaSamplesL1[ref_idx_l1 [x0][y0]]==pic_height_in_luma_samples.

If bcwIdx is equal to 0 (default; no weighted bi-prediction) or ciip_flag[xCb][yCb] is equal to 1 or refResampleIdx is not equal to 0, the prediction sample values are derived as a combination of non-weighted prediction reference samples as follows:

pbSamples[$x$][$y$]=Clip3(0,(1<<bitDepth)−1, (predSamples$L$0[$x$][$y$]+predSamples$L$1[$x$][$y$]+offset2)
>>shift2)

Otherwise:
 The variable w1 is set equal to bcwWLut[bcwIdx] with bcwWLut[k]={4, 5, 3, 10, −2}. This is a list of weights to be used in weighted prediction.
 The variable w0 is set equal to (8−w1).
 The prediction sample values are derived as a combination of weighted prediction reference samples as follows:

pbSamples[$x$][$y$]=Clip3(0,(1<<bitDepth)−1, ($w$0*predSamples$L$0[$x$][$y$]+$w$1*predSamples$L$1[$x$][$y$]+
offset3)>>(shift2+3))

In a second aspect, prediction with RPR may employ most probable weight lists and selection based on resolution of reference and current picture(s). A most probably weight list may associate a probability for each weight in the list. For example, the first entry in a list may be the most probable weight used for weighting a prediction (and hence its use may be coded with the fewest bits), and each subsequent weight in the list may have sequentially lower probability for use (and hence use of each subsequent weight may be coded with increasing numbers of bits).

In this second aspect, the lists of weights may be selected or signaled at a higher layer, such as a layer corresponding for the SPS, PPS, slice or tile group header associated with the current picture, slice or tile group, while selection and signaling of which weight in a list may applied to a reference during prediction may be at a lower layer, such as a layer corresponding to the prediction unit layer.

In an aspect, multiple lists of prediction weights may be used. For example, different lists may be provided for different probability distributions of use for different weights. In some aspects, selection of which list of weights is used may be based on the resolution of a reference picture. In other aspects, the selection of which list of weights is used may be signaled in the bitstream at the prediction unit level. For example, the signaling may be done using fixed-length coding, variable length coding, such as Huffman, exp-golomb coding, or arithmetic coding.

Below, some sub-methods are proposed that can be applied separately or in combination with other proposed methods/sub-methods in this document:

Method 1: Categorization of Weight-List Based on Reference Resolution

In a first method for prediction with RPR, a list of weights may first be categorized based on the prediction reference resolution, and then implicitly infer the category at CU-level. For example, as a general solution separate lists of weights may be used when samples fall in the following categories:
 a) predicted from lower resolution L0 and L1 reference pictures as the current picture
 b) predicted from a lower resolution L0 reference picture and a same resolution as the current picture L1 reference picture
 c) predicted from a lower resolution L0 reference picture and a higher resolution L1 reference picture
 d) predicted from a higher resolution L0 reference picture and a lower resolution L1 reference picture
 e) predicted from a higher resolution L0 reference picture and a same resolution as the current picture L1 reference picture
 f) predicted from higher resolution L0 and L1 reference pictures than the current picture
 g) predicted from a same resolution as the current picture L0 reference picture and a lower resolution L1 reference picture
 h) predicted from a same resolution as the current picture L0 and L1 reference pictures
 i) predicted from a same resolution as the current picture L0 reference picture and a higher resolution L1 reference picture For each of the above categories, a different list of weights can be defined and the index signaled in the bitstream. As an example, the weight list for category (h) can be {L0=1/2, L1=1/2}, {L0=5/8, L1=3/8}, {L0=3/8,L1=5/8}, {L0=10/8, L1=−2/8}, {L0=−2/8,L1=10/8}. Persons skilled in the art will appreciate that these are merely exemplary weights. In particular, for other categories, the weights may be adjusted to account for the differences in the resolution of the references. For example, the weights for category (c), may bias the higher resolution L1 reference picture than the L0 reference picture. For example, the weights {L0=3/8, L1=5/8}, {L0=−2/8, L1=10/8} may be placed first in the list, and either add the remaining weight combinations at the end of the list or remove them completely from the list. Other weights e.g. {L0=2/8, L1=6/8}, {L0=1/8, L1=7/8}, etc could also be added. The weights to be added in the list could be known independently from the bitstream, or could also be explicitly signaled in a high level syntax element of the bitstream (e.g. in the SPS, PPS, or slice header).

It may be noted that the benefit from such categorization is rather clear as index=0 (corresponding to the lowest entropy entry in a weight list) can be signaled for the most probable weight where as per the current scheme an index=2 would need to be sent to realize the same. In some aspects, the default weights may also be kept at the beginning of the weight list.

The above categories and weights are provided as only examples. In other aspects, the number of categories and the number of weights per category can vary and may be a subset of the examples above. In a first additional example, the number of categories and the category type can be explicitly signaled. In a second additional example, the number of categories and category types can be implicitly inferred as the above or a subset of the above list.

The above example uses bi-prediction without considering also the relationship between the resolution of the references instead of the relationship of each reference and its resolution with the current picture. Such extensions may be straightforward based on the same principles, i.e. weighting more the reference with the highest resolution versus other references for weighted prediction.

Method 2: Signaling Weights or Scaling Factors for Each Category

In a second method for prediction with RPR, for "each category" or for a "group of categories," a weight list-table may be pre-defined and an index in the list may be signaled at the coding unit-level. Alternatively, for "each category" or for a "group of categories" a weight list-table can be explicitly signaled at the coding unit-level or slice-level or picture-level or sequence-level. Both of these techniques may be applied separately for each reference picture list (L0 and L1) or shared across reference picture lists (L0 and L1).

These techniques can be applied separately for each component (luma and chroma cb and cr) or shared across components. One example implementation of the above scheme is as follows:

The variable 'category' is set equal to one of the categories defined in method 1.

The bcwIdx is calculated based on a signaled value as bcwIdx is set equal to bcw_idx[xCb][yCb], where (xCb, yCb) correspond to a luma location of the top-left sample of the current luma coding block relative to the top-left luma sample of the current picture.

The bcwWLut[category][bcwIdx] is defined or explicitly signaled for each category The variable w1 is set equal to bcwWLut[category][bcwIdx].

The variable w0 is set equal to (8−w1).

The prediction sample values may derived as follows:

pbSamples[x][y]=Clip3(0,(1<<bitDepth)−1, ($w0$*predSamples$L0$[x][y]+$w1$*predSamples$L1$[x][y]+offset3)>>(shift2+3))

In another example implementation of the above scheme with separate weights for each reference picture list (List0 and List 1):

The variables 'categoryL0' and 'categoryL1' are set equal to one of the categories defined in method 1.

The bcwIdx is calculated based on a signaled value as bcwIdx is set equal to bcw_idx[xCb][yCb], where (xCb, yCb) correspond to a luma location of the top-left sample of the current luma coding block relative to the top-left luma sample of the current picture.

The bcwWLutL0[categoryL0][bcwIdx] and bcwWLutL1[categoryL1][bcwIdx] is defined or explicitly signaled for each category.

The variable w0 is set equal to bcwWLutL0[categoryL0][bcwIdx] and w1 is set equal to bcwWLutL1[categoryL1][bcwIdx].

The prediction sample values are derived as follows.

pbSamples[x][y]=Clip3(0,(1<<bitDepth)−1, ($w0$*predSamples$L0$[x][y]+$w1$*predSamples$L1$[x][y]+offset3)>>(shift2+3))

Method 3: Signaling a Scaling Factor for Each Category

In a third method for prediction with RPR is similar to the second method, but instead of using a weight list-table, a scaling factor can be used. For "each category" or for a "group of categories" a scaling factor may be derived based on the resolution of the reference picture(s) and the current picture. Alternatively, for "each category" or for a "group of categories" a scaling factor may be explicitly signaled based on the resolution of the reference picture(s) and the current picture at the coding tree unit-level, coding unit-level, or slice-level. Both these techniques may be applied separately for each reference picture list (L0 and L1) or shared across reference picture lists (L0 and L1). When the scaling factors are shared across reference picture lists, a scaling factor may be signaled for one of the lists based on the category and index (say scalingFactor[category][bcwIdx]) and the scaling factor for the other list is derived as (K−scalingFactor[category][bcwIdx]), where K is the normalization factor. One example implementation of the above scheme is as follows:

The variable 'categoryL0' and 'categoryL1' is set equal to one of the categories defined in method 1.

The bcwIdx is calculated based on a signaled value.

The variables bcwWLutL0[categoryL0][bcwIdx] and bcwWLutL1[categoryL1][bcwIdx] are defined or explicitly signaled for each category.

The variables scalingFactorL0[categoryL0][bcwIdx] and scalingFactorL1[categoryL1][bcwIdx] are defined or explicitly signaled for each category.

The variable w0 is set equal to bcwWLutL0[category][bcwIdx]*scalingFactorL0[category][bcwIdx] and the variable w1 is set equal to bcwWLutL1[category][bcwIdx]*scalingFactorL1[category][bcwIdx].

The prediction sample values are derived as follows:

pbSamples[x][y]=Clip3(0,(1<<bitDepth)−1, ($w0$*predSamples$L0$[x][y]+$w1$*predSamples$L1$[x][y]+offset3)>>(shift2+3))

In addition, the above techniques may be applied separately for Luma and chroma components or the same process could be used. Furthermore, as before, these techniques can be extended to multi-hypothesis prediction.

Resolution-Based Explicit Weighted Prediction Scheme

Below, methods are proposed with explicitly signaled weighted prediction based on the resolutions of the current picture and its references. A scaling factor (scalingFactor) may be signaled at the slice-level or coding unit-level based on the category or reference relationship/classification to compensate for the explicit weighted prediction weights. Here the category may be similar to categories discussed in method 1 above. In one example, the scalingFactor can be signaled or derived differently for each reference picture list based on the current reference classification. In another example, the scalingFactor can be signaled or derived differently for each component or all components may share the same parameters. An example implementation for the luma component using the above scheme is as follows:

The variable shift1 is set equal to Max(2, 14−bitDepth). For luma samples, the variables log 2Wd, o0, o1, w0 and w1 are derived as follows:

log 2$Wd$=luma_log 2_weight_denom+shift1

$w0$=LumaWeight$L0$[refIdx$L0$]*scalingFactor$L0$[categoryL0]

$w1$=LumaWeight$L1$[refIdx$L1$]*scalingFactor$L1$[categoryL1]

$o0 = \text{luma\_offset\_}l0[\text{refIdx}L0] << (\text{BitDepth}_Y - 8)$ $o1 = \text{luma\_offset\_}l1[\text{refIdx}L1] << (\text{BitDepth}_Y - 8)$ $\text{pbSamples}[x][y] = \text{Clip3}(0, (1 << \text{bitDepth}) - 1,$ $(\text{predSamples}L0[x][y] * w0 + \text{predSamples}L1[x][y] * w1 + ((o0 + o1 + 1) << \log 2Wd)) >> (\log 2Wd + 1))$ Generalized Weighted Prediction for Multi-Hypothesis Mode In the multi-hypothesis mode, more than two references may be used for prediction. Both the weight-list and explicit signaling techniques discussed above can be extended to a multi-hypothesis mode. For example, the number of categories can be extended to be based on the resolutions of all the hypotheses used for the prediction of the current coding unit.

Resolution-Based Adaptive Resampling Filters

Figure 6B:
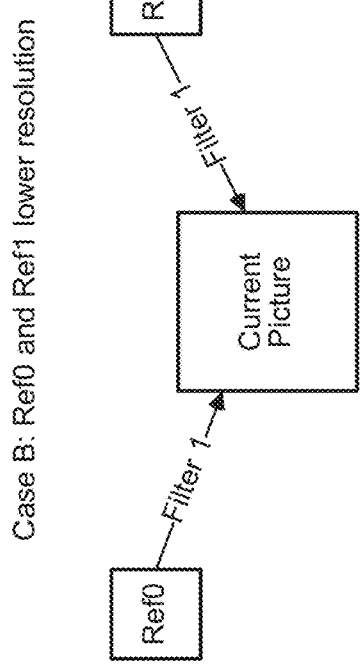
FIG. 6B depicts an example of resampling filter selection.
Figure 6D:
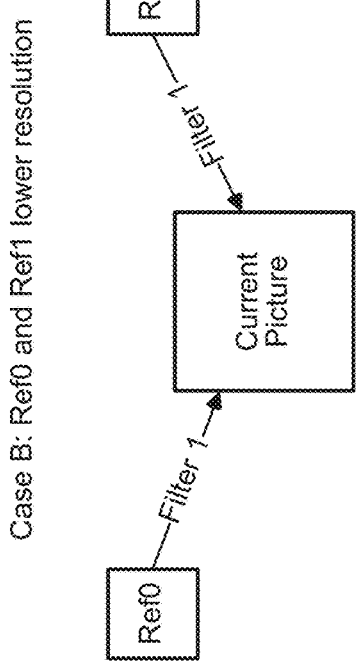
FIG. 6D depicts an example of resampling filter selection.
Figure 6A:
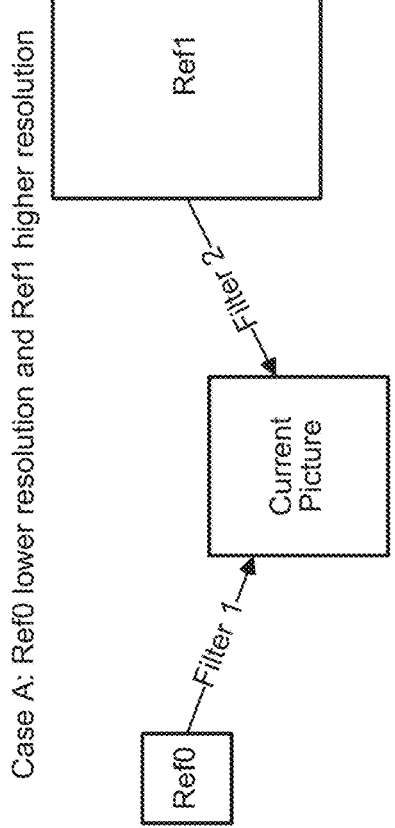
FIG. 6A depicts an example of resampling filter selection.

FIG. 6A depicts an example 600 of resampling filter selection, and FIG. 6B depicts an example 620 of resampling filter selection. Filters for resampling/interpolation of reference picture data may be adaptive based on the original resolutions of all the reference pictures used in the prediction process. For example, different filters may be used for up-sampling and down-sampling of the reference pictures. In the examples of FIGS. 6A and 6B, when the resolution of the reference picture is smaller than the resolution of the current picture, a Filter 1 is always used. Otherwise, Filter 2 is used.

Figure 6C:
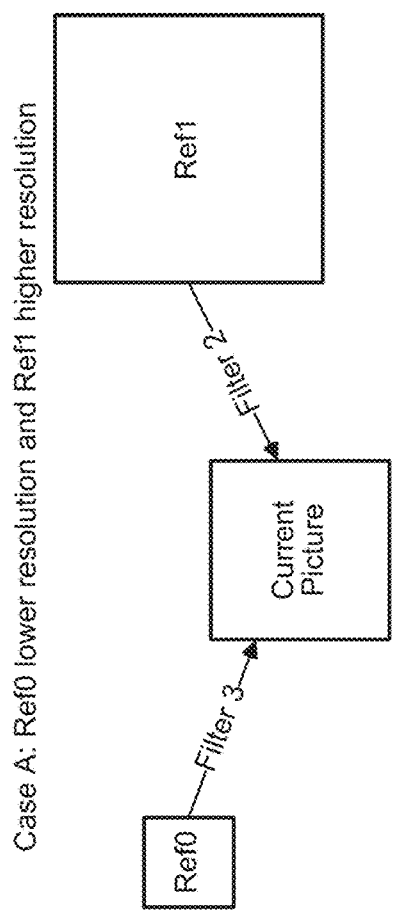
FIG. 6C depicts an example of resampling filter selection.

FIG. 6C depicts an example 640 of resampling filter selection, and FIG. 6D depicts an example 660 of resampling filter selection. A more flexible design is possible that considers the resolution of all the reference pictures used for prediction. It may be beneficial to apply different filters when averaging weighted bi-prediction samples coming from references having the same resolution compared to those of different resolution. For example, as depicted in FIGS. 6C and 6D, filter 2 and filter 3 are applied in case A of FIG. 6C where Ref0 and Ref1 are different resolutions, while in case B of FIG. 6D, filter 1 is used where Ref0 and Ref1 have a similar resolution.

In an aspect, a list of filters may be categorized based on the resolution of the reference pictures used for the prediction of the current coding unit. For example, the categorization described in Method 1 above may be used. In another aspect, pre-defined or explicitly signaled filters (for example at SPS, PPS, Slice level) may be used for each category.

As an example of applying reference picture categorization to FIG. 6D, and referring to the example categories of Method 1 above, for category (a) and category (h), Filter 1 may be selected and signaled for upsampling/interpolation of both reference pictures Ref0 and Ref1. As another example for FIG. 6C, for category (c), Filter 3 may be selected and signaled for upsampling/interpolation while Filter 2 may be selected and signaled for downsampling/interpolation.

Such a signaling is more flexible and can enable the ability to apply different filters based on the resolution of all the reference pictures used for prediction in the current coding unit leading to a better prediction signal.

Reference Resolution-Based Deblocking Filter

Deblocking Filter decisions may be based on the resolution of the reference pictures used in the prediction process. The decision on how to derive the deblocking filter strength and to perform the deblocking filtering process for an edge of a pixel block may depend on how the adjacent blocks corresponding to the edges were coded.

Figure 7A:
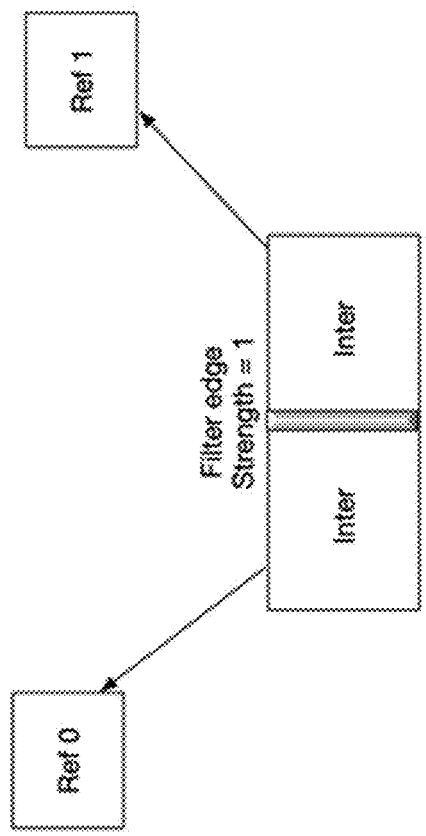
FIG. 7A depicts an example deblocking filter strength selection.

For example, for uni-prediction when applying a deblocking filter to a first pixel block at an edge corresponding to adjacent pixel block, where both the first block and the adjacent bock are inter coded, and the prediction references for the first block and the adjacent block come from different reference pictures, then the strength of the deblocking filter is set as 1. This example is depicted as example 700 of deblocking filter strength selection in FIG. 7A. In FIG. 7A, it is assumed that Ref0 and Ref1 have the same resolution as the current picture.

Figure 7B:
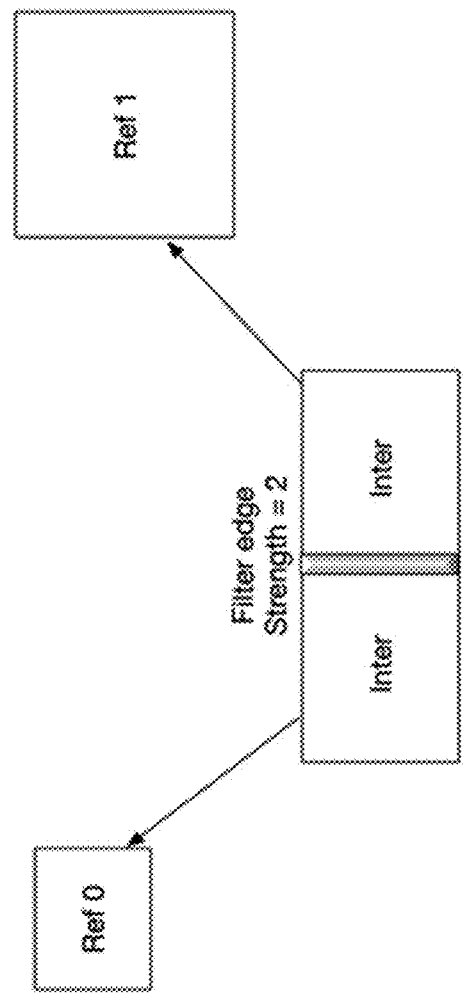
FIG. 7B depicts an example deblocking filter strength selection.

In an aspect, boundary filtering strengths may additionally be based on whether at least one of the references used in the adjacent blocks corresponding to an edge had resolution different from the resolution of the current picture. FIG. 7B depicts an example 750 deblocking filter strength selection. In the example 750, a different filtering strength (such as strength=2) may be used in cases where the references are of a different resolution. Alternately, the adjacent block may be classified based on the resolution of its respective prediction references, and a deblocking filter may be selected for application at the edge between adjacent blocks based on their classification.

This can be extended for the bi-prediction case, i.e. a different deblocking strength will be set if at least one prediction reference in List 0 and List 1 used by the adjacent coding blocks and the current coding block associated with an edge being filtered has different resolution compared to the current picture resolution.

These techniques may be applied to all color components (luma and chroma).

The decision to apply a stronger filter, e.g. a filter with a lower cutoff frequency, is made based on: 1) whether samples at either one side of a boundary to be filtered belong to a large block or not (width/height is larger than or equal to 32); 2) the signaled thresholds 'β' and $t_C$ value in the bitstream; and 3) based on the difference (delta) of the sample values across the boundary.

In a first aspect, a stronger deblocking filter may be selected based on the following, in addition or in combination with the above criterion: if at least one of the references used for prediction comes from a different resolution compared to the resolution of the current picture.

In a second aspect, a stronger deblocking filter may be selected based on, in addition or in combination to the above criterion: whether at least one of the references used for prediction comes from a lower resolution compared to the resolution of the current picture.

In a second aspect, a stronger deblocking filter may be selected based on, in addition or in combination to the above criterion: whether at least one of the references used for prediction comes from a higher resolution compared to the resolution of the current picture.

Encoding with Reference Picture Resampling

Figure 8:
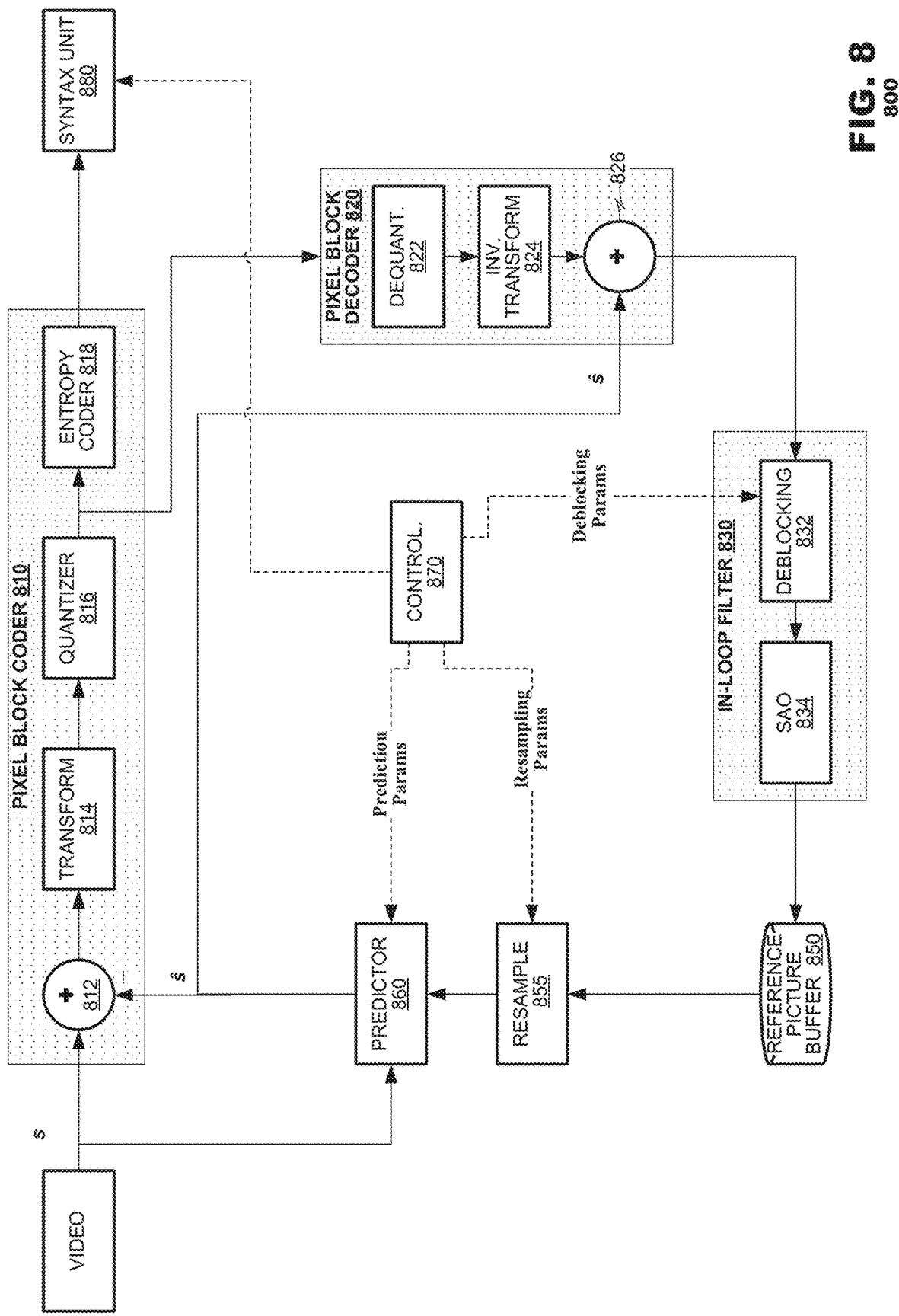
FIG. 8 is an example functional block diagram of an example coding system.

FIG. 8 is a functional block diagram of a coding system 800 according to an aspect of the present disclosure. The system 800 may include a pixel block coder 810, a pixel block decoder 820, an in-loop filter system 830, a reference frame store 850, a resampling filter 855, a predictor 860, a controller 870, and a syntax unit 880. The predictor 860 may generate a prediction block ŝ for use by pixel block coder 810 and pixel block decoder 820. Prediction block ŝ may be a prediction of a newly-presented blocks of the input source video, and prediction block ŝ may be based on previously decoded image data stored in reference frame store 850. In an aspect, a prediction reference from reference picture buffer 850 may be resampled by resampling filter 855, and then prediction block ŝ may be based on the resampled version of the previously decoded image data. The pixel block coder 810 may code the new pixel block by predictive coding techniques and present coded pixel block data to the syntax unit 880. The pixel block decoder 820 may decode the coded pixel block data, generating decoded pixel block data therefrom. The in-loop filter 830 may perform one or more filtering operations on the reconstructed frame. For example, the in-loop filter 830 may perform deblocking filtering, sample adaptive offset (SAO) filtering, adaptive loop filtering (ALF), maximum likelihood (ML) based filtering schemes, deringing, de-banding, sharpening, resolution scaling, and the like. The reference frame store 850 may store the filtered frame, where it may be used as a source of prediction of later-received pixel blocks. The syntax unit 880 may assemble a data stream from the coded pixel block data, which conforms to a governing coding protocol.

The pixel block coder 810 may include a subtractor 812, a transform unit 814, a quantizer 816, and an entropy coder 818. The pixel block coder 810 may accept pixel blocks s of input data at the subtractor 812. The subtractor 812 may receive predicted pixel blocks ŝ from the predictor 860 and generate an array of pixel residuals therefrom representing a difference between the input pixel block s and the predicted pixel block ŝ. The transform unit 814 may apply a transform to the sample data output from the subtractor 812, to convert data from the pixel domain to a domain of transform coefficients. The quantizer 816 may perform quantization of transform coefficients output by the transform unit 814. The quantizer 816 may be a uniform or a non-uniform quantizer. The entropy coder 818 may reduce the bandwidth of the output of the coefficient quantizer by losslessly coding the output, for example, by variable-length code words or using a context adaptive binary arithmetic coder.

The transform unit 814 may operate in a variety of transform modes as determined by the controller 870. For example, the transform unit 814 may apply a discrete cosine transform (DCT), a discrete sine transform (DST), a Walsh-Hadamard transform, a Haar transform, a Daubechies wavelet transform, or the like. In an aspect, the controller 870 may select a coding mode M to be applied by the transform unit 815, may configure the transform unit 815 accordingly and may signal the coding mode M in the coded video data, either expressly or impliedly.

The quantizer 816 may operate according to a quantization parameter QP supplied by the controller 870. In an aspect, the quantization parameter QP may be applied to the transform coefficients as a multi-value quantization parameter, which may vary, for example, across different coefficient locations within a transform-domain pixel block. Thus, the quantization parameter QP may be provided as a quantization parameter array.

The entropy coder 818, as its name implies, may perform entropy coding of data output from the quantizer 816. For example, the entropy coder 818 may perform run length coding, Huffman coding, Golomb coding, Context Adaptive Binary Arithmetic Coding, and the like. Entropy coder 818 may also entropy code various encoding parameter, such as quantization parameters QP, resampling parameters, prediction parameters, or deblocking parameters.

The pixel block decoder 820 may invert coding operations of the pixel block coder 810, and may operate on blocks of the same shape and size as pixel block coder 810. For example, the pixel block decoder 820 may include a dequantizer 822, an inverse transform unit 824, and an adder 826. The pixel block decoder 820 may take its input data from an output of the quantizer 816. Although permissible, the pixel block decoder 820 need not perform entropy decoding of entropy-coded data since entropy coding is a lossless event. The dequantizer 822 may invert operations of the quantizer 816 of the pixel block coder 810. The dequantizer 822 may perform uniform or non-uniform de-quantization. Similarly, the inverse transform unit 824 may invert operations of the transform unit 814. The dequantizer 822 and the inverse transform unit 824 may use the same quantization parameters QP and transform mode M as their counterparts in the pixel block coder 810. Quantization operations likely will truncate data in various respects and, therefore, data recovered by the dequantizer 822 likely will possess coding errors when compared to the data presented to the quantizer 816 in the pixel block coder 810.

The adder 826 may invert operations performed by the subtractor 812. It may receive the same prediction pixel block ŝ from the predictor 860 that the subtractor 812 used in generating residual signals. The adder 826 may add the prediction pixel block to reconstructed residual values output by the inverse transform unit 824 and may output reconstructed pixel block data.

The in-loop filter 830 may perform various filtering operations on recovered pixel block data. For example, the in-loop filter 830 may include a deblocking filter 832 and a sample adaptive offset (SAO) filter 834, and/or other types of in-loop filters (not shown).

The reference frame store 850 may store filtered frame data for use in later prediction of other pixel blocks. Different types of prediction data are made available to the predictor 860 for different prediction modes. For example, for an input pixel block, an intra predictor takes a prediction reference from decoded data of the same frame in which the input pixel block is located. Thus, the reference frame store 850 may store decoded pixel block data of each frame as it is coded. For the same input pixel block, an inter predictor may take a prediction reference from previously coded and decoded frame(s) that are designated as reference frames. Thus, the reference frame store 850 may store these decoded reference frames.

The resampling filter 855 may resample previously decoded image data stored in reference picture buffer 850. In an aspect, resampling filter 855 may resample reference picture data from an original or coded resolution of the reference picture to match the resolution of a current image being coded. In an aspect, resampling parameters, such as selection of a resampling filter, may be based on the source resolution of the reference pictures being resampled. In other aspects, resampling filter 855 may resample reference picture data from a source bit-depth, chroma format, or color space of the reference picture to match the corresponding attribute of a current image being coded, and resampling parameters maybe selected based on the corresponding attribute of the source reference pictures being resampled.

In an optional aspect not depicted, reference picture buffer 850 may also store resampled reference pictures output from the resampling filter 855 for later use by predictor 860. In this optional aspect, when a resampled reference picture is used to generate more than one prediction, that source reference picture may only be resampled once.

In an aspect, predictor 860 may operate on different types of blocks than block coder 810 and block coder 820. A predicted picture store (not depicted) may collect multiple prediction blocks output by predictor 860 for use by pixel block coder 810 and decoder 820. This may enable coder 810 and decoder 820 to operate on blocks of a different shape, size, or offset within a frame than is predicted by predictor 860.

In another aspect, in-loop filter 830 may operate on multiple pixel blocks at a time. A decoded picture store (not depicted) may collect multiple decoded pixel blocks output from pixel block decoder 820 for use by in-loop filter 830. This may enable, for example, in-loop filter 830 to filter across pixel block boundaries The controller 870 may control overall operation of the coding system 800. The controller 870 may select operational parameters for the resample filter 855, the predictor 860, and the in-loop filter 830 based on the original resolution(s) of one or more reference pictures (before applying the resample filter). As is relevant to the present discussion, when these operational parameters are selected, controller 870 may provide those parameters to the entropy coder 818 or the syntax unit 880, which may include data representing those parameters in the data stream of coded video data output by the system 800. The controller 870 also may select parameters for the pixel block coder 810 and decoder 820, such as quantization parameters QP, and may include metadata identifying the parameters selected for each portion of coded data. Additionally, the controller 870 may control other aspects of operation of the in-loop filter 830 and the prediction unit 860. Such control may include mode selection for the prediction unit 860 (lambda, modes to be tested, search windows, distortion strategies, etc.) and SAO filtering parameters for the in-loop filter 840.

During operation, the controller 870 may revise operational parameters such as QP, resampling parameters, prediction parameters, and deblocking parameters at different granularities of image data (different portion sizes of the image data), either on a per pixel block basis or on a larger granularity (for example, per frame, per slice, per largest coding unit ("LCU") or Coding Tree Unit (CTU), or another region). In an aspect, the deblocking filter parameters may be revised on a per-pixel basis within a coded frame. Similarly, a compressed bitstream output by syntax unit 880 may include indications of operational parameters at different levels in a syntax hierarchy such as syntax levels corresponding to a pixel block, frame, slice, LCU, CTU or other portion of the compressed bitstream.

Decoding with Reference Picture Resampling

Figure 9:
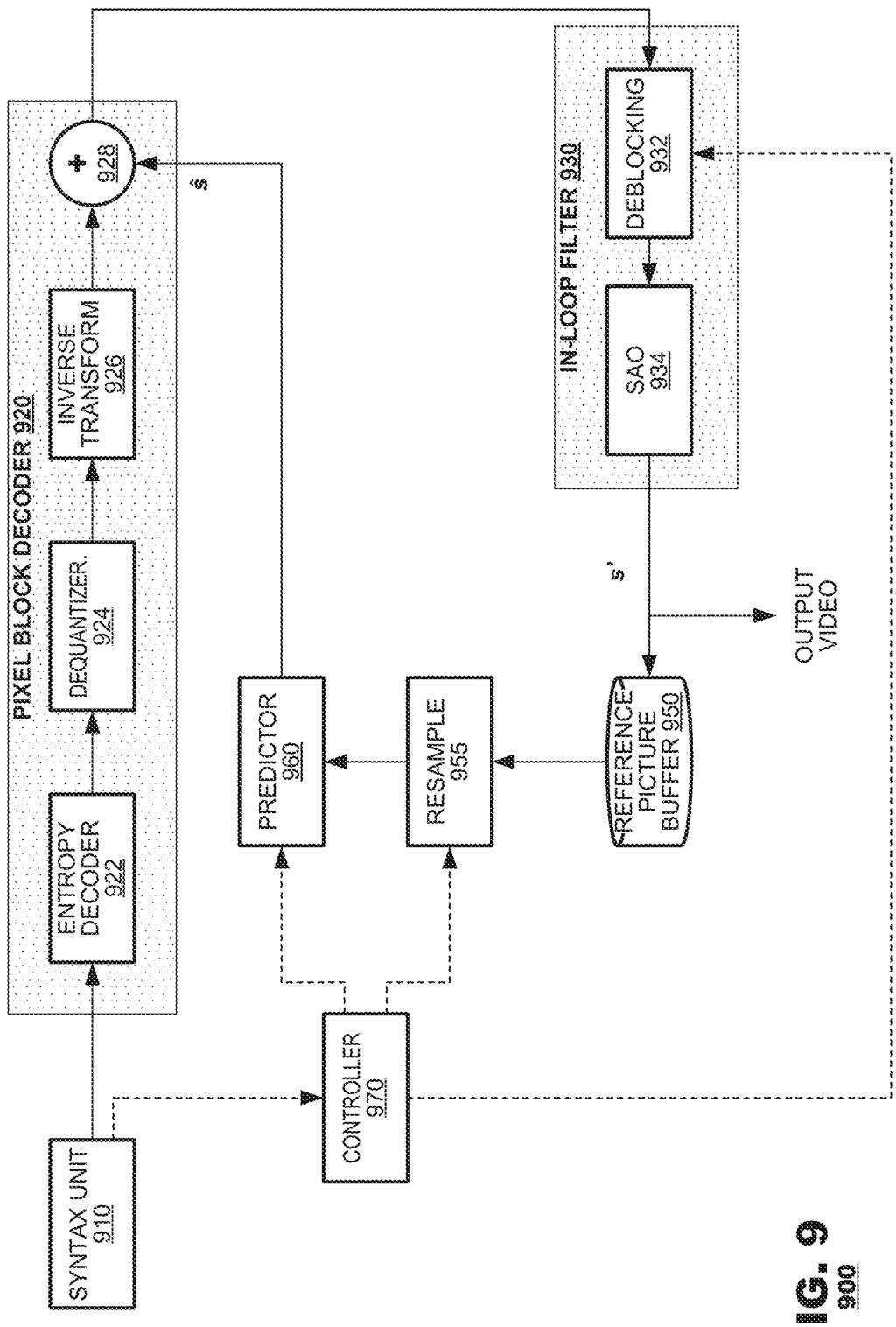
FIG. 9 is an example functional block diagram of an example decoding system.

FIG. 9 is a functional block diagram of a decoding system 900 according to an aspect of the present disclosure. The decoding system 900 may include a syntax unit 910, a pixel block decoder 920, an in-loop filter 930, a reference frame store 950, a predictor 960, and a controller 970. As with the encoder (FIG. 8), a frame store (not depicted) between the predictor 960 and the pixel block decoder 920 may allow for different block shape, size or offset between prediction and coding.

The syntax unit 910 may receive a coded video data stream and may parse the coded data into its constituent parts. Data representing coding parameters may be furnished to the controller 970, while data representing coded residuals (the data output by the pixel block coder 810 of FIG. 8) may be furnished to its respective pixel block decoder 920. The predictor 960 may generate a prediction block ŝ from reference data available in the reference frame store 950 according to coding parameter data provided in the coded video data. It may supply the prediction block ŝ to the pixel block decoder. The pixel block decoder 920 may invert coding operations applied by the pixel block coder 810 (FIG. 8). The in-loop filter 940 may filter the reconstructed frame data. The filtered image data may be a reconstructed approximation of source video data s' and may be output from the decoding system 900 as output video. Filtered frames that are designated to serve as reference frames also may be stored in the reference frame store 950 for later use by predictor 960.

The pixel block decoder 920 may include an entropy decoder 922, a dequantizer 924, an inverse transform unit 926, and an adder 928. The entropy decoder 922 may perform entropy decoding to invert processes performed by the entropy coder 818 (FIG. 8). The dequantizer 924 may invert operations of the quantizer 916 of the pixel block coder 810 (FIG. 8). Similarly, the inverse transform unit 926 may invert operations of the transform unit 814 (FIG. 8). They may use the quantization parameters QP and transform modes M that are provided in the coded video data stream. Because quantization is likely to truncate data, the pixel blocks s' recovered by the dequantizer 924, likely will possess coding errors when compared to the input pixel blocks s presented to the pixel block coder 810 of the encoder (FIG. 8).

The adder 928 may invert operations performed by the subtractor 810 (FIG. 8). It may receive a prediction pixel block from the predictor 960 as determined by prediction references in the coded video data stream. The adder 928 may add the prediction pixel block to reconstructed residual values output by the inverse transform unit 926 and may output reconstructed pixel block data.

The in-loop filter 940 may perform various filtering operations on recovered pixel block data as identified by the coded video data. For example, the in-loop filter 940 may include a deblocking filter 932, a sample adaptive offset (SAO) filter 934, and/or other types of in-loop filters. In this manner, operation of the in-loop filter 930 mimics operation of the counterpart in-loop filter 830 of the encoder 800 (FIG. 8).

The reference frame store 950 may store filtered frame data for use in later prediction of other pixel blocks. The reference frame store 950 may store whole decoded reference frames, and it may store a partially decoded frame as it is decoded for use in intra prediction.

The resampling filter 955 may resample previously decoded image data stored in reference picture buffer 950. In an aspect, resampling filter 855 may resample reference picture data from a source resolution of the reference picture to match the resolution of a current image being decoded. In an aspect, resampling parameters, such as selection of a resampling filter, may be based on the source resolution of the reference pictures being resampled.

In an aspect, as with the encoder, predictor 960 may operate on different types of blocks than the block types used by block decoder 920. A predicted picture store (not depicted) may collect multiple prediction blocks output by predictor 960 for use by pixel block decoder 920. This may enable block decoder 920 to operate on blocks of a different shape, size, or offset within a frame than is predicted by predictor 960.

In another aspect, in-loop filter 930 may operate on multiple pixel blocks at a time. A decoded picture store (not depicted) may collect multiple decoded pixel blocks output from pixel block decoder 920 for use by in-loop filter 930. This may enable, for example, in-loop filter 1030 to filter across pixel block boundaries The controller 970 may control overall operation of the coding system 900. The controller 970 may set operational parameters for the various elements of coding system 900 based on parameters received in the coded video data stream. As is relevant to the present discussion, these operational parameters may include parameters for predictor 960, resampling filter 955, and deblocking filter 932, in addition to other parameters for pixel block decoder 920 and in-loop filter 930. In an aspect, these operational parameters may be inferred from the resolution(s) of reference pictures. In another aspect, information indicating these operation parameters may be extracted from a compressed bitstream by syntax unit 910. As discussed, the operational parameters may vary at various granularities of image data and be communicated in and extracted from various levels of compressed bitstream syntax, for example, on a per pixel block basis, a per frame basis, a per slice basis, a per LCU/CTU basis, or based on other types of portions of the video.

FIG. 10 is an example functional block diagram for weighted prediction of image data 1000. When embodied in an encoder, the predictor 1004 may search amongst decoded image data in the reference picture buffer 1002 for image data that exhibits strong correlation with a source pixel block. When the predictor 1004 finds an appropriate prediction reference(s) for the source pixel block, it may generate motion vector data (MVs) that may be output to the decoder as part of the coded video data stream. The predictor 1004 may retrieve a reference pixel block from the reference picture buffer 1002 to form a prediction. The resultant prediction may output, for example, to adders 812 and 826 (FIG. 8) when embodied in an encoder, or adder 928 (FIG. 9) when embodied in a decoder. In forming the prediction from two source L1 and L0, pixel data from the reference picture buffer 1002 may be scaled by scale factors W1 and W0 and shifted by offset O. In an aspect, pixel data sources L1 and L0 may represent references frames selected from lists List1 and List0 of available reference frames, respectively. In the bi-prediction case depicted in FIG. 10, the scalars 1010 and 1012 may scale pixel data of the reference pictures L1 and L0, respectively, by scale factors W1 and W0, which may have unity gain (w=1) in appropriate circumstances. The adder 1014 may sum the scaled pixel data together with offset O to create the bi-predicted pixel data. The offset may be zero or have a negative value in appropriate circumstances. The scalars 1010, 2012 and adder 1014, therefore, may cooperate to support weighted prediction in which a predicted pixel block is generated as:

$$\text{Pred}(i,j)=(W1*L1(i,j))+(W0*L0(i,j))+O,$$

where Pred(i,j) represents pixel values at pixel location (i,j) of a predicted pixel block, L1(i,j) and L0(i,j) represents pixel values of extracted from the reference picture buffer 1002 according to the motion predictor, W1 and W0 represents the scale factors applied at scalars 1010 and 1012, and O represents the offset applied at adder 1014. In an aspect, W1 may be determined from W0, or vice versa. For example, W1=1−W0. In an aspect, offset O may be determined to be the sum of an offset O1 associated with reference L1 and an offset O0 associated with reference L0.

In an aspect, weighted uni-prediction may be done without an L1 reference, and such that predicted pixel block is generated as:

$$\text{Pred}(i,j)=(W0*L0(i,j))+O$$

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in physical storage media such as electronic, magnetic, and/or optically-based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. An image processing method, comprising:
   decoding reference picture(s) having corresponding reference resolution(s);
   determining prediction weight(s) for the reference picture(s) based on the corresponding reference resolutions(s);
   resampling the decoded reference picture(s); and
   predicting a portion of a current image based on the resampled reference picture(s) and the prediction weight(s).

2. The method of claim 1, wherein:
   the predicting is multihypothesis prediction with two reference pictures; and
   the prediction weights depend on the difference in resolution of the two reference pictures.

3. The method of claim 2, wherein,
   a first prediction weight is determined for a first reference picture having a first resolution; and
   a second prediction weight, lower than the first prediction weight, is determined for a second reference picture having a second resolution lower than the first resolution.

4. The method of claim 1, wherein, when at least one of the corresponding reference resolutions is smaller than a current resolution of the current image, then all the prediction weights are determined to be the same weight.

5. The method of claim 1, wherein the prediction weights for the reference picture(s) are determined by selecting an entry from a list of prediction weights, and wherein the prediction weights are encoded in a bitstream along with an indication of the relative probabilities of the weights in the list of prediction weights.

6. The method of claim 1, wherein the prediction weights for the reference picture(s) are determined by selecting an entry from a list of prediction weights based on the corresponding reference resolution(s).

7. The method of claim 1, wherein the prediction weights for the reference picture(s) are determined by selecting an entry from a list of prediction weights, and the list of prediction weights is selected from a plurality of lists of weights based on the corresponding reference resolution(s).

8. The method of claim 1, wherein
the prediction reference(s) are classified as based on whether their corresponding reference resolutions(s) are larger or smaller than a current resolution of the current image; and
the prediction weights for the reference picture(s) are determined based on the classification(s).

9. A system for image processing, comprising:
a decoder for decoding reference pictures having corresponding reference resolution(s);
a reference picture buffer storing the decoded reference pictures;
a resampler for resampling reference pictures from the reference picture buffer;
a controller for prediction weight(s) for the reference picture(s) based on the corresponding reference resolution(s); and
a predictor for predicting a current image based on the resampled reference pictures and the prediction weights.

10. The system of claim 9, wherein:
the predicting is multihypothesis prediction with two reference pictures;
the prediction weights depend on the difference in resolution of the two reference pictures;
a first prediction weight is determined for a first reference picture having a first resolution; and
a second prediction weight, lower than the first prediction weight, is determined for a second reference picture having a second resolution lower than the first resolution.

11. A non-transitory computer readable medium having instructions that, when executed by a processor, cause:
decoding reference picture(s) having corresponding reference resolution(s);
determining prediction weight(s) for the reference picture(s) based on the corresponding reference resolution(s);
resampling the decoded reference picture(s); and
predicting a portion of a current image based on the resampled reference picture(s) and the prediction weight(s).

12. The medium of claim 11, wherein:
the predicting is multihypothesis prediction with two reference pictures;
the prediction weights depend on the difference in resolution of the two reference pictures;
a first prediction weight is determined for a first reference picture having a first resolution; and
a second prediction weight, lower than the first prediction weight, is determined for a second reference picture having a second resolution lower than the first resolution.

* * * * *